United States Patent [19]

Shimizu et al.

[11] Patent Number: 5,508,361
[45] Date of Patent: Apr. 16, 1996

[54] POLYMER SCALE PREVENTIVE AGENT AND PROCESS OF PRODUCING POLYMER USING THE SAME

[75] Inventors: Toshihide Shimizu; Mikio Watanabe, both of Ibaraki, Japan

[73] Assignee: Shin-Etsu Chemical Co., Ltd., Tokyo, Japan

[21] Appl. No.: 424,070

[22] Filed: Apr. 19, 1995

[30] Foreign Application Priority Data

Apr. 20, 1994 [JP] Japan .................................. 6-104595

[51] Int. Cl.$^6$ ................................ C08F 2/00; C08G 8/04
[52] U.S. Cl. ............................................. 526/62; 528/153
[58] Field of Search ................................ 526/62; 528/153

[56] References Cited

U.S. PATENT DOCUMENTS 4,431,783  2/1984  Walker et al. ............................ 526/62

*Primary Examiner*—Joseph L. Scofer
*Assistant Examiner*—Wu C. Cheng
*Attorney, Agent, or Firm*—Oblon, Spivak, McClelland, Maier & Neustadt

[57] ABSTRACT

The polymer scale preventive agent comprises an alkaline solution containing (A) an condensation product of (A-1) a hydroxybiphenyl compound with (A-2) an aldehyde compound, (B) a reaction stopper, and (C) an inorganic colloid and is used for polymerization of a monomer having an ethylenically unsaturated double bond. The process of producing the polymer comprises polymerizing the monomer in a polymerization vessel having a coating film on its inner wall surfaces, whereby polymer scale is prevented from being deposited, wherein said coating film is formed by applying, on said inner wall surfaces, said alkaline solution, followed by drying. According to the invention, deposition of polymer scale can be effectively prevented not only on the areas in the liquid phase but also at and in the vicinity of the interface between the gas and liquid phases in a polymerization vessel. Therefore, the invention does not require to conduct the operation of removing the polymer scale after every polymerization run, whereby the productivity is improved. Further, when the polymeric product obtained using the method of the invention is processed into formed products such as sheets, the resulting formed products have very few fish eyes. In addition, the formed products obtained as above are low in initial coloration.

6 Claims, No Drawings

POLYMER SCALE PREVENTIVE AGENT AND PROCESS OF PRODUCING POLYMER USING THE SAME

BACKGROUND OF THE INVENTION

1. Field of the Invention

The present invention relates to a polymer scale preventive agent useful in polymerization of a monomer having an ethylenically unsaturated double bond, and a process of producing a polymer using said agent.

2. Description of the Prior Art

As a method of polymerizing a monomer having an ethylenically unsaturated double bond, there have hitherto been known suspension polymerization, emulsion polymerization, solution polymerization, gas phase polymerization and bulk polymerization. In any type of the polymerizations, polymer scale is liable to be deposited on the areas with which the monomer comes into contact during polymerization, such as inner walls, agitation equipment, etc. of a polymerization vessel.

Deposition of the polymer scale results in disadvantages that the yield of the polymer and cooling capacity of the polymerization vessel lowers; that the polymer scale may peel off and mix into the resulting polymer, thereby impairing the quality of formed products obtained by forming the polymer; and that the removal work of such a polymer scale not only is extremely laborious and hence time-consuming, but also may cause physical disorders, which are serious problems among the operators in recent years, due to unracted monomers which are contained in the polymer scales.

Heretofore, with regard to preventing the polymer scale deposition on inner walls, etc. of polymerization vessels during polymerization of a monomer having an ethylenically unsaturated double bond, there is known a method of coating a polymer scale preventive agent consisting of an organic polar compound, such as an amine compound, a quinone compound or an aldehyde compound, on the inner walls, etc. of the polymerization vessel to form a coating film, and a method of adding these compounds into an aqueous medium where suspension polymerization is effected, as locally practiced, for example, in suspension polymerization of vinyl chloride [Japanese Patent Publication (KOKOKU) No. 45-030343 (1970)].

However, such methods have the disadvantages that although a polymer scale preventive effect is exhibited while polymerization is repeated for up to about 5 or 6 batches, the preventive effect decreases (is inferior in durability) when the numbers or times of repeated batches of polymerization exceed 5 or 6. The decrease in the preventive effect is remarkable especially when used a water-soluble catalyst in polymerization, so that these methods can not be satisfied from the industrial view.

In order to overcome the above disadvantages, there are proposed, for example, methods of coating a polymer scale preventive agent containing, as an effective component, such as a condensation product of an aromatic amine compound with an aromatic nitro compound [Japanese Patent Publication (KOKOKU) No. 60-30681], a reaction product of a phenolic compound with an aromatic aldehyde [Japanese Pre-examination Patent Publication (KOKAI) No. 57-192414], a reaction product of a polyhydric phenol with an aliphatic aldehyde [Japanese Patent Publication (KOKOKU) No. 57-502169], and a reaction product of 1-naphthole with formaldehyde [Japanese Patent Publication (KOKOKU) No. 01-31523], and the like.

In case where each of these polymer scale preventive agents is coated on the areas, with which the monomer comes into contact during polymerization, such as inner walls, etc. of a polymerization vessel to thereby form a coating film, polymer scale deposition on the areas in the liquid phase of the polymerization vessel does not occur, even if polymerization batches are repeated about 100 to 200 times. Similarly, also in case where said water-soluble catalyst is used, polymer scale deposition on the liquid phase areas is prevented.

However, said polymer scale preventive agents have a drawback that polymer scale deposition is liable to occur at and in the vicinity of the interface between a gas phase and a liquid phase which is located at the upper of the polymerization vessel, even if a coating film of a polymer scale preventive agent containing, as the effective component, the condensation product of said aromatic amine compound with said aromatic nitro compound and the like is formed.

Once polymer scale is deposited at or in the vicinity of the interface between the gas phase and the liquid phase, the deposited scale will grow gradually as polymerization runs are repeated, and at last peel off from the inner wall, etc. to get mixed with the polymeric product. If the polymeric product containing the polymer scale is processed into formed products such as sheets or the like, the polymer scale causes increase in fish eyes in the formed products, thereby lowering seriously the quality of the products.

Meanwhile, where polymeric products obtained by polymerization are processed into formed products such as sheets, etc., the formed products are required to have a high whiteness. When a polymeric product is formed into a sheet or the like without adding any coloring agent, the resulting formed product is more or less colored. Such coloration is called initial coloration, which is desired to be as low as possible. However, when a coating film containing, as the effective component, the condensation product of said aromatic amine compound with said aromatic nitro compound, etc. is formed, the coating film may be peeled or dissolved during polymerization and mix into polymeric products, the resulting formed products will exhibit a low whiteness, that is, an inferior initial whiteness.

SUMMARY OF THE INVENTION

It is an object of the present invention to provide a polymer scale preventive agent for use in polymerization of a monomer having an ethylenically unsaturated double bond that can prevent effectively the deposition of polymer scale not only in the areas in the liquid phase but also at and in the vicinity of the interface between the gas and liquid phases, and that makes it possible to produce polymeric products with a very small number of fish eyes and a low initial coloration after being processed into formed products such as sheet or the like; and a process of producing a polymer using the agent.

In order to attain the above object, the present invention provides a polymer scale preventive agent for use in polymerization of a monomer having an ethylenically unsaturated double bond, comprising an alkaline solution containing (A) an condensation product of (A-1) a hydroxy biphenyl compound with (A-2) an aldehyde compound, (B) a reaction stopper, and (C) an inorganic colloid.

The present invention also provides a process of producing a polymer of a monomer having an ethylenically unsaturated double bond, which comprises polymerizing the monomer in a polymerization vessel having a coating film on its inner wall surfaces, whereby polymer scale is prevented from being deposited, wherein said coating film is formed by applying, on said inner wall surfaces, an alkaline solution containing (A) an condensation product of (A-1) a hydroxy biphenyl compound with (A-2) an aldehyde compound, (B) a reaction stopper, and (C) an inorganic colloid, followed by drying.

According to the present invention, deposition of polymer scale can be effectively prevented not only on the areas in the liquid phase but also at and in the vicinity of the interface between the gas and liquid phases in a polymerization vessel. Therefore, the present invention does not require to conduct the operation of removing the polymer scale after every polymerization run, whereby the productivity is improved.

Further, when the polymeric product obtained using the polymerization method of the present invention is processed into formed products such as sheets, the resulting formed products have very few fish eyes. In addition, the formed products obtained as above are low in initial coloration. That is, the formed products exhibit a luminosity index (L) in the Hunter's color difference equation described in JIS Z 8730 (1980) of 70 or more in the case of vinyl chloride polymers and 80 or more in the case of SBR.

DETAILED DESCRIPTION OF THE PREFERRED EMBODIMENTS

Component (A)
(A-1) Hydroxybiphenyl compound
The hydroxybiphenyl compound (A-1) is the compound represented, for example, by the following general formula (1).

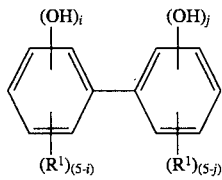

(1)

wherein $R^1$, which may be the same or different, are each —H, —C, —Br, —OCH$_3$, —COOH, —SO$_3$H, or an alkyl group having 1 to 3 carbon atoms, and i is an integer of 1 to 5 and j is an integer of 0 to 5.

Typical examples of the compound represented by the general formula (1) include 2-hydrodxybiphenyl, 3-hydrodxybiphenyl, 4-hydrodxybiphenyl, 2,2'-dihydrodxybiphenyl, 3,3'-dihydrodxybiphenyl, 4,4'-dihydrodxybiphenyl, 2,2'-dihydroxy-5,5'-dimethylbiphenyl, 2,2'-dihydroxy-4,4', 5,5'-tetramethylbiphenyl, 2,2'-dihydroxy- 5,5'-dichlorobiphenyl, 2,2'-dihydroxybiphenyl-5-carboxylic acid, 2,2'-dihydroxybiphenyl-5-sulfonic acid, 5-methoxy- 2,2'-dihydroxybiphenyl, 2-hydroxybiphenyl-5-carboxylic acid and 2-hydroxybiphenyl-5-sulfonic acid.

Among these hydroxybiphenyl compounds, preferred are 2,2'-dihydroxybiphenyl, 2-hydroxybiphenyl, 2,2'-dihydroxy- 5,5'-dimethylbiphenyl and 2,2'-dihydroxy-5,5'-dichlorobiphenyl.

The above dihydroxybiphenyl compounds can be used singly or in combination of two or more.

(A-2) Aldehyde compound
The aldehyde compound is an organic compound having at least one, preferably one or two, aldehyde group (—CHO group).

Examples of the aldehyde compound include the compounds represented by the following general formulas (2) to (4).

(2)

wherein $R^2$ is —H, —COOH, —CHO or a substituted or unsubstituted alkyl group having 1 to 5 carbon atoms.

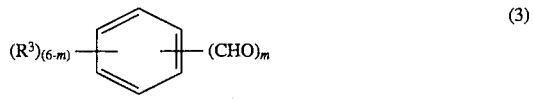

(3)

wherein $R^3$ is —H or —OH and when a plurality of $R^3$ are present, they may be the same or different, and m is an integer of 1 to 6.

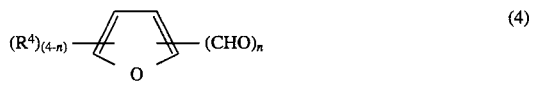

(4)

wherein $R^4$ is —H or an alkyl group having 1 to 5 carbon atoms and when a plurality of $R^4$ are present, they may be the same or different, and n is an integer of 1 to 4.

In the above compound represented by the general formula (2), the alkyl group defined in $R^2$ has preferably 1 to 4 carbon atoms. In case where the alkyl group is substituted by a substituent, and as the substituent there are exemplified methyl, ethyl, propyl and butyl groups, and the like.

Typical examples of the compound represented by the above general formula (2) include formaldehyde, acetaldehyde, glyoxylic acid, glyoxal, propionaldehyde, butylaldehyde, isobutylaldehyde, valeraldehyde, isovaleraldehyde, pivalic aldehyde and caproaldehyde.

Typical examples of the compound represented by the above general formula (3) include benzaldehyde, salicylaldehyde, phthalaldehyde.

In the above compound represented by the general formula (4), the alkyl group defined in R4 has preferably 1 to 3 carbon atoms. Typical examples of the compound represented by the above general formula (4) include heterocyclic aldehydes such as furfural, 5-methyl-2-furaldehyde, β-furaldehyde, 5-ethyl- 2-furaldehyde, 5-methyl-3-furaldehyde, 5-propyl-2-furaldehyde and 5-butyl-2-furaldehyde.

Among the above aldehyde compounds, preferred are formaldehyde, glyoxylic acid, benzaldehyde, salicylaldehyde and furfural.

The above aldehyde compounds can be used singly or in combination of two or more.

Preparation of the condensation product (A)
The condensation product (A) is prepared by condensing the hydroxybiphenyl compound (A-1) and the aldehyde compound (A-2). The condensation of the hydroxybiphenyl compound (A-1) with the aldehyde compound (A-2) is carried out by reacting them in water and in the presence of a catalyst usually at 50° to 150° C. for 1 to 20 hours, preferably at 60° to 110° C. for 2 to 12 hours.

The rate of the hydroxybiphenyl compound (A-1) to the aldehyde compound (A-2), which are used in the preparation of the condensation product (A), is affected by the kinds of the aldehyde compound (A-2) and catalyst, reaction temperature, reaction time, and the like, but the amount of the aldehyde compound (A-2) is preferably 0.1 to 10 mol per mol of the hydroxybiphenyl compound (A-1), and more preferably 0.3 to 3 mol.

The above catalyst includes, for example, acid catalysts such as phosphuric acid, sulfuric acid and hydrochloric acid; basic catalysts such as NaOH, KOH, LiOH and NH3. The amount of the catalyst is not particularly limited but is in the range of 0.1 to 10 mol, preferably 0.5 to 5 mol, per mol of the hydroxybiphenyl compound (A-1).

The total concentration of the hydroxybiphenyl compound (A-1), the aldehyde compound (A-2) and the catalyst in water is in the range of preferably 0.1 to 30 mol/L, more preferably 1 to 10 mol/L.

Component (B)

The reaction stopper of the component (B) has an action of stopping the above condensation reaction of the hydroxybiphenyl compound (A-1) with the aldehyde compound (A-2). The condensation product of the component (A) is normally accompanied by unreacted hydroxybiphenyl compound (A-1) and aldehyde compound (A-2) which cause the resulting polymer scale preventive agent chemically unstable to thereby lower a polymer scale preventive effect. However, it is assumed that since the polymer scale preventive agent is stabilized by the action of the component (B), the polymer scale preventive effect is improved. Furthermore, since the component (B) per se has a polymer scale preventive effect, this preventive effect is more improved by the addition of the component (B). The mechanism of the polymer scale preventive effect is not clear but is assumed because the component has an action of preventing radicals and the like generated by polymerization reaction from being adsorbed to the inner wall surfaces.

As the reaction stopper of the component (B), there is used, for example, a reducing agent. Typical examples of the reducing agent include hydrogen; hydrides such as hydrogen iodide, hydrogen bromide, lithium aluminum hydride, sodium boron hydride, calcium boron hydride, zinc boron hydride, tetraalkylammonium boron hydride, trichlorosilane, triethylsilane; lower oxides and lower oxy-acid salts, such as carbon monoxide, sulfur dioxide, sodium thiosulfate, sodium thiosulfite, sodium sulfite, potassium sulfite, sodium bisulfite, sodium hydrosulfite; sulfur compounds such as Rongalit, sodium sulfide, sodium polysulfide, ammonium sulfide; large-electropositive metals and amalgams thereof, for example, alkali metals such as sodium and lithium, magnesium, calcium, aluminum, and zinc; salts of metals in the state of a low valence, such as iron (II) sulfate, tin (II) chloride, titanium (III) trichloride; phosphor compounds such as phosphor trichloride, phosphor triiodide, trimethylphosphine, triphenylphosphine, trimethylphosphite ?, hexamethylphosphorous triamide; hydrazine; diboranes and substituted boranes, such as diborane, ethane-1,2-diaminoborane, dimethylamine-borane, and pyridineborane.

Among the reaction stopper of the component (B), preferred are hydrogen iodide, hydrogen bromide, sodium boron hydride, sulfur dioxide, sodium thiosulfate, sodium thiosulfite, sodium sulfite, potassium sulfite, sodium bisulfite, sodium hydrosulfite and Rongalit.

The above reaction stopper can be used singly or in combination of two or more.

The content of the component (B) in the polymer scale preventive agent of the present invention is in the range of usually 0.01 to 500 parts by weight, preferably 0.1 to 200 parts by weight, per 100 parts by weight of the above component (A).

Component (C)

The inorganic colloid of the component (C) is a colloid prepared by a dispersion method using water as a dispersion medium or a condensation method, and the particle size of the colloid is in the range of 1 to 500 mµ.

The inorganic colloid includes specifically, for example, a colloid of oxide or hydroxide of a metal selected from the group consisting of aluminum, thorium, titanium, zirconium, antimony, tin, iron and the like; a colloid selected from the group consisting of tungstic acid, vanadium pentoxide, gold and silver colloids; silver iodide sol; and a colloid of selenium, sulfur, silica or the like. Among the above inorganic colloids, preferable are the colloids of oxides or hydroxides of a metal selected from the group consisting of aluminum, titanium, zirconium, tin and iron, and the colloidal silica.

The inorganic colloid (C) can be used singly or in combination of two or more.

The component (C) is added in an amount of usually 0.1 to 1,000 parts by weight, preferably 1 to 600 parts by weight, per 100 parts by weight of the component (A).

Preparation of the polymer scale preventive agent

The polymer scale preventive agent of the present invention comprises an alkaline solution containing the above condensation product (A), the reaction stopper (B) and the inorganic colloid (C). By applying and then drying the polymer scale preventive agent on the inner wall surfaces, etc. of a polymerization vessel to thereby form a coating film, deposition of polymer scale on the inner wall surfaces, etc. of the polymerization vessel can be prevented.

The polymer scale preventive agent is prepared, for example, by admixing an aqueous medium with the above condensation product (A), the reaction stopper (B) and the inorganic colloid (C) and then adjusting the pH of the resulting mixture liquid to alkalinity.

In case where the condensation product (A) used in the preparation of the polymer scale preventive agent is one prepared using a basic catalyst, the resulting condensation reaction liquid, which is obtained after completing the condensation reaction and contains the condensation product (A), is alkaline. Accordingly, the reaction liquid can be used intact for the preparation of the polymer scale preventive agent. Meanwhile, in case where the condensation product (A) is one prepared using an acid catalyst, a solvent contained in the resulting condensation liquid is removed and thereafter the condensation product (A) is washed, followed by drying at a low temperature under reduced pressure. The thus obtained dried product is used for the preparation of the polymer scale preventive agent.

As an aqueous medium for use in the preparation of the polymer scale preventive agent, water is generally used. However, a mixed solvent of water and an organic solvent compatible with water can be also used. The organic solvent compatible with water includes, for example, alcohols such as methanol, ethanol, propanol and the like; ketones such as acetone, methyl ethyl ketone and the like; and esters such as methyl acetate, ethyl acetate and the like. In case where a mixed solvent of water and the organic solvent compatible with water is used, the content of the organic solvent is preferably so selected as to avoid dangers of inflammation, explosion or the like and obviate safety problems in handling, e.g., toxicity. Specifically, the amount of the organic solvent in the mixed solvent is preferably 50% by weight or less, more preferably 30% by weight or less.

The polymer scale preventive agent is alkaline and has a pH in the range of preferably 9 to 14, more preferably 11 to 13. Typical examples of an alkaline compound for use in adjusting the pH include NaOH, KOH, LiOH, NH3 and the like.

In order to more improve a polymer scale preventive effect, it is preferred that a water-soluble polymer compound (D) is added to said preventive agent.

The water-soluble polymer compound (C) includes, for example, an amphoteric polymer compound such as gelatin and casein; an anionic polymer compound such as polyacrylic acid, polystyrenesulfonic acid, carboxymethyl cellulose and alginic acid; a cationic nitrogen-containing polymer compound such as polyvinylpyrrolidone, chitosan and polyacrylamide; and a hydroxyl group-containing polymer compound such as polyvinylalcohol, hydroxyethyl cellulose, hydroxypropyl cellulose and pectin.

Among the above water-soluble polymer compounds (C), preferable are gelatin, casein, polyacrylic acid, carboxymethyl cellulose, polyvinylpyrrolidone and pectin.

Said water-soluble polymer compound may be used singly or in combination of two or more.

The component (D) is added in an amount of usually 0.1 to 1,000 parts by weight, preferably 1 to 300 parts by weight, based on 100 parts by weight of the component (A).

The total concentration of the components (A), (B) and (C) in the polymer scale preventive agent is not particularly limited, so long as the total coating weight described later can be obtained. Normally, however, the total concentration ranges from about 0.005 to 10% by weight, and preferably from about 0.03 to 2% by weight.

Formation of a coating film

In order to form a coating film on the inner wall surfaces of a polymerization vessel using the polymer scale preventive agent prepared in the manner as above, said preventive agent is first applied to the inner wall surfaces of the polymerization vessel and then dried sufficiently at a temperature from room temperature to 100° C., for instance, followed by washing with water if necessary.

The polymer scale preventive agent is preferably applied to not only the inner wall surfaces of a polymerization vessel but also other areas with which the monomer comes into contact during polymerization to form the coating film on such areas. For example, on a stirring shaft, stirring blades, baffles, condensers, headers, search coil, bolts, nuts, etc.

More preferably, for forming the coating film, the polymer scale preventive agent is applied to areas with which monomers do not come into contact during polymerization but on which polymer scale may deposit, for example, the areas with which unreacted monomers comes into contact of an unreacted monomer recovery system; specifically, the inner surfaces, etc., of equipments and pipings of the recovery system. Specifically, such areas include the inner surfaces of monomer distillation columns, condensers, monomer stock tanks and valves.

The method of applying the polymer scale preventive agent to the inner wall surfaces of a polymerization vessel is not particularly limited, and includes, for example, the brush coating, spray coating, the method of filling the polymerization vessel with the coating liquid followed by withdrawal thereof, and otherwise automatic coating methods as disclosed in Japanese Pre-examination Patent Publication (KOKAI) Nos. 57-61001 and 55-36288, and Japanese Patent Publication (KOHYO) Nos. 56-501116 and 56-501117, and Japanese Pre-examination Publication (KOKAI) No. 59-11303, etc.

The method of drying wet coated surfaces provided by application of the polymer scale preventive agent is not limited, either. Following methods can be used. That is, a method in which, after the polymer scale preventive agent is applied, hot air with at a suitable elevated temperature is blown to the coated surface, and a method in which the inner wall surface of a polymerization vessel and the surfaces of other areas to be coated are previously heated to from 30° to 80° C., and the polymer scale preventive agent is directly applied to the heated inner wall surfaces, etc. After dried, the coated surfaces are washed with water if necessary.

The coating film thus obtained usually has a coating weight of 0.001 to 5 g/m$^2$, and preferably from 0.05 to 2 g/m$^2$.

The coating operation is not necessarily to be conducted every batch of polymerization, since the formed coating film has good durability and retains the polymer scale-preventing action. Therefore, productivity is improved.

Polymerization

After the formation of the coating film on the inner wall surfaces of a polymerization vessel, and preferably also on other areas with which monomer may come into contact during polymerization, polymerization is carried out in accordance with conventional procedures. That is, a monomer having an ethylenically unsaturated double bond, a polymerization initiator, and optionally a polymerization medium such as water, a suspending agent, a solid dispersing agent, a dispersing agent such as nonionic or anionic surfactants are charged into the polymerization vessel, followed by carrying out polymerization according to conventional methods.

The monomer having an ethylenically unsaturated double bond to which this invention can be applied may include, for example, vinyl halides such as vinyl chloride; vinyl esters such as vinyl acetate and vinyl propionate; acrylic acid, methacrylic acid, and esters or salts thereof; maleic acid, fumaric acid, and esters or anhydrides thereof; and diene monomers such as butadiene, chloroprene and isoprene; styrene; acrylonitrile; vinylidene halides; and vinyl ethers; and the like. These may be used singly or in combination of two or more.

There are no particular restrictions on the type of polymerization to which this invention can be applied. The present invention is effective in any type of polymerization such as suspension polymerization, emulsion polymerization, solution polymerization, bulk polymerization, and gas phase polymerization. Particularly, the present invention is more suitable to polymerizations in an aqueous medium such as suspension or emulsion polymerization.

In the following, general conditions are described on each type of polymerizations.

In the case of suspension or emulsion polymerization, first, water and a dispersing agent are charged into a polymerization vessel, and thereafter a polymerization initiator is charged. Subsequently, the inside of the polymerization vessel is evacuated to a pressure of from 0.1 to 760 mmHg, and a monomer is then charged, whereupon the pressure inside the polymerization vessel usually becomes from 0.5 to 30 kgf/cm$^2$. Besides, said polymerization initiator may be added before or after the monomer is charged. Thereafter, polymerization is carried out at a temperature of from 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization is carried out at 30° to 80° C.; in the case of polymerizing styrene, polymerization is carried out at 50° to 150° C. The polymerization may be judged to be completed when the pressure inside the polymerization vessel falls to that of from 0 to 7 kgf/cm$^2$ or when cooling water which passes through a jacket provided around the polymerization vessel indicates almost the same temperature at the inlet where it is charged and at the outlet where it is discharged (i.e., when liberation of heat due to polymerization reaction has subsided). The water, dispersing agent and polymerization initiator to be charged for polymerization are used in amounts of 20 to 500 parts by weight, 0.01 to 30 parts by weight, and 0.01 to 5 parts by weight, respectively, per 100 parts by weight of the monomer.

In the case of solution polymerization, an organic solvent such as toluene, xylene and pyridine is used as the polymerization medium in place of water. The dispersing agent is optionally used. The other conditions are generally the same as those described for suspension and emulsion polymerizations.

In the case of bulk polymerization, after the inside of a polymerization vessel is evacuated to a pressure of from about 0.01 mmHg to 760 mmHg, a monomer and a polymerization initiator are charged into the polymerization vessel, and then polymerization is carried out at a temperature of from −10° to 250° C. For example, in the case of polymerizing vinyl chloride, polymerization is carried out at 30° to 80° C.; in the case of polymerizing styrene, polymerization is carried out at 50° to 150° C.

The present invention makes it possible to prevent polymer scale from depositing, independent of materials constituting the inner wall surfaces, etc., of a polymerization vessel. For example, this invention can prevent deposition of polymer scale even in the case that polymerization is carried out in a polymerization vessel made of a steel including stainless steel or lined with glass.

Any additive materials that have been conventionally added in a polymerization system can be used without any limitation. More specifically, this invention can effectively prevent polymer scales from depositing, even in polymerization systems containing the following additives: for example, polymerization initiators such as t-butyl peroxyneodecanoate, bis(2-ethylhexyl) peroxydicarbonate, 3,5,5-trimethylhexanoyl peroxide, (α-cumyl peroxyneodecanoate, cumene hydroperoxide, cyclohexanone peroxide, t-butyl peroxypivalate, bis(2-ethoxyethyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis- 2,4-dimethylvaleronitrile, potassium peroxodisulfate, ammonium peroxodisulfate, and p-menthane hydroperoxide; suspension agents including natural or synthetic polymeric compounds such as partially saponified polyvinyl alcohols, polyacrylic acid, vinyl acetate/maleic anhydride copolymer, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as mercaptans, e.g. t-dodecyl mercaptan, and trichloroethylene; and pH adjusters.

The polymer scale preventive agent of the present invention may be added to a polymerization system in addition to the formation of the coating film, so that the scale preventing effect is further improved. The amount of the polymer scale preventive agent to be added to the polymerization system is preferably in the range of about 5 to 1,000 ppm based on the total weight of the monomers charged. The addition should be conducted so that it may not adversely affect the quality of polymeric products to be obtained with respect to fish eyes, bulk density, particle size distribution, etc.

EXAMPLES

The present invention will now be described in detail below with reference to working examples thereof and comparative examples. In each table below, experiments marked with * are comparative examples and the other experiments are working examples of the present invention.

Preparation of condensation product No. 1

A 2-liter three-necked separable flask equipped with a reflux condenser, thermometer and stirrer was charged with 1 liter of water, 1 mol of 2,2'-dihydroxybiphenyl as a hydroxybiphenyl compound (A-1), 1.2 mol of formaldehyde as an aldehyde compound (A-2), and 1 mol of phosphoric acid as a catalyst. Then, while said flask was heated at 85° C. on an oil bath, the reaction mixture in the flask was reacted under stirring in a nitrogen stream for 5 hours, followed by cooling. Next, the solvent contained in the thus cooled reaction mixture was removed and thereafter the resulting residue was washed, followed by drying at 50° C. under reduced pressure. Thus, a condensation product hereinafter referred to as condensation product No. 1. was obtained.

Preparation of condensation product Nos. 2 to 10

The same procedure as in the preparation of condensation product No. 1 as above was repeated to prepare respective condensation product Nos. 2 to 10, except that a hydroxybiphenyl compound (A-1), an aldehyde compound (A-2), and a catalyst as shown in Table 1 were used and condensation reaction was carried out under the conditions (total concentration of (A-1)+(A 2)+catalyst, molar ratio of (A-1):(A-2):catalyst, reaction temperature, and reaction time) as shown in Table 1. In this connection, condensation No. 2 is the condensation product described in example 1 of Japanese Patent Publication (KOKOKU) No. 1-31523.

[TABLE 1]

| (A) Condensation product No. | (A-1) Hydroxybiphenyl compound | (A-2) Aldehyde compound | Catalyst | Solvent | Total concentration of (A-1) + (A-2) + catalyst (mol/l) | (A-1):(A-2): catalyst (mol ratio) | Reaction temp. (°C.) | Reaction time (hr) |
|---|---|---|---|---|---|---|---|---|
| 1 | 2,2'-Dihydroxybiphenyl | Formaldehyde | Phosphoric acid | Water | 2.9 | 1:1.2:1 | 85 | 5 |
| 2 | 2,2'-Dihydroxybiphenyl | Formaldehyde | NaOH | Water | 3.8 | 1:1:0.72 | 70 | 4.5 |
| 3 | 2,2'-Dihydroxybiphenyl | Formaldehyde | Phosphoric acid | Water | 3.0 | 1:0.9:1 | 95 | 6 |
| 4 | 2,2'-Dihydroxybiphenyl | Formaldehyde | Phosphoric acid | Water | 3.0 | 1:1:1.2 | 95 | 6 |
| 5 | 2-Hydroxybiphenyl | Benzaldehyde | Phosphoric acid | Water | 3.0 | 1:1:1.3 | 95 | 6 |

[TABLE 1]-continued

| (A) Condensation product No. | (A-1) Hydroxybiphenyl compound | (A-2) Aldehyde compound | Catalyst | Solvent | Total concentration of (A-1) + (A-2) + catalyst (mol/l) | (A-1):(A-2): catalyst (mol ratio) | Reaction temp. (°C.) | Reaction time (hr) |
|---|---|---|---|---|---|---|---|---|
| 6 | 2,2'-Dihydroxy-5,5'-dimethylbiphenyl | Furfral | Phosphoric acid | Water | 3.0 | 1:1:1.5 | 95 | 6 |
| 7 | 1,2-'-Dihydroxy-5,5'-dichlorobiphenyl | Glyoxylic acid | Phosphoric acid | Water | 3.0 | 1:1:1.2 | 95 | 8 |
| 8 | 2,2'-Dihydroxybiphenyl | Salicylaldehyde | Phosphoric acid | Water | 3.0 | 1:1:1.1 | 95 | 9 |
| 9 | 2,2'-Dihydroxybiphenyl | Benzaldehyde | Sulfuric acid | Water | 3.0 | 1:0.8:1.2 | 95 | 10 |
| 10 | 2,2'-Dihydroxybiphenyl | Glyoxylic acid | Hydrochloric acid | Water | 3.0 | 1:0.8:1 | 95 | 6 |

Example 1

(Experiment Nos. 101 to 114)

In each experiment, polymerization was conducted using a stainless steel polymerization vessel with an inner capacity of 2,000 liters and having a stirrer.

In each experiment, the polymer scale preventive agent was prepared using a condensation product (A), a reaction stopper (B), an inorganic colloid (C) and a water-soluble polymer compound (D) as shown in Table 2, and a solvent and an alkaline compound as shown in Table 3 in such a manner that the conditions (formulation of solvent, total concentration of (A)+ (B)+(C)+(D), weight ratio of (A):(B):(C):(D), and pH) as shown in Table3 are attained. The inorganic colloids (a to g in Tables 2 and 6) of component (C) used in this Example and Example 2 as set forth later are as shown in Table 5.

In each experiment, the polymer scale preventive agent was applied to the inner wall, the stirring shaft, the stirring blades and other areas, with which a monomer comes into contact, of the polymerization vessel. The thus applied preventive agent was dried by heating at 50° C. for 15 minutes to form a coating film, and the inside of the polymerization vessel was washed with water.

Thereafter, in each experiment polymerization was carried out as follows. Into the polymerization vessel in which the coating film was formed as above, 800 kg of water, 400 kg of vinyl chloride, 500 g of a partially saponified polyvinyl alcohol, 50 g of hydroxypropylmethyl cellulose and 140 g of 3,5,5-trimethylhexanoylperoxide were charged, followed by polymerization with stirring at 66° C. for 6 hours. After the completion of the polymerization, the produced polymer was taken out and unreacted monomer was recovered. Subsequently, the inside of the polymerization vessel was washed with water and residual resin was removed.

As one batch being the operations from the formation of the coating film via the polymerization to the washing of the inside of the polymerization vessel with water, the same operatoins as above was repeated. The number of repetition times is shown in Table 4. After the final batch was over, the amount of polymer scale deposited on an area located in the liquid phase and on an area in the vicinity of the interface between the gas and liquid phases in the polymerization vessel, was measured according to the following method. The results are given in Table 4.

Measurement of the amount of polymer scale

The scale deposited in an area of 10 cm square on the inner wall of the polymerization vessel is scraped off with a stainless steel spatula as completely as possible to be confirmed with naked eyes, and then the scraped scale is weighed on a balance. Thereafter, the amount of the deposited scale per area of 1 $m^2$ is obtained by multiplying the measured value by 100.

The number of fish eyes which may appear when a polymer is formed into sheet was measured with respect to the polymers produced in the experiments according to the method below. The results are given in Table 4.

Measurement of fish eyes

A 100 parts by weight of a polymer, 50 parts by weight of dioctyl phthalate (DOP), 1 part by weight of dibutyltin dilaurate, 1 part by weight of cetyl alcohol, 0.25 part by weight of titanium oxide and 0.05 part by weight of carbon black are formulated to prepare a mixture. The mixture is kneaded at 150° C. for 7 minutes with 6 inch rolls, and then formed into a sheet 0.2 mm thick. The sheet is examined for the number of fish eyes per 100 $cm^2$ by light transmission.

Further, to evaluate initial coloration at the time a polymer is formed into sheet, luminosity index (L) was measured according to the method below. The results are given in Table 4.

Measurement of luminosity index (L)

A hundred parts by weight of a polymer, 1 part by weight of a tin laurate stabilizing agent (trade name: TS-101, product of Akisima Chemical Co.) and 0.5 part by weight of a cadmium stabilizing agent (trade name: C-100J, product of Katsuta Kako Co.), and 50 parts by weight of dioctylphthalate as a plasticizer are kneaded at 160° C. for 5 minutes with a twin roll mill, and then formed into a sheet 1 mm thick. Subsequently, this sheet is placed in a mold measuring 4 cm×4 cm×1.5 cm (depth), is heated at 160° C. under a pressure of 65 to 70 kgf/$cm^2$ for 0.2 hour to prepare a test specimen. This test specimen is measured for luminosity index (L) in the Hunter's color difference equation described in JIS Z 8730 (1980). The higher the value of L of the test specimen, the higher the whiteness (namely, the lower the initial coloration) of the polymer.

The value of L is determined as follows. The stimulus value Y of XYZ color system is determined according to the photoelectric tristimulus colorimetry using the standard light C, photoelectric colorimeter (Color measuring color difference meter Model Z-1001DP, product of Nippon Denshoku Kogyo K.K.) in accordance with JIS Z 8722. As the geometric condition for illumination and being illuminated, the condition "d" defined in section 4.3.1 of JIS Z 8722 is adopted. Next, L is calculated based on the equation: $L=10Y^{1/2}$ described in JIS Z 8730 (1980).

[TABLE 2]

| Experiment No. | (A) Condensation product No. | (B) Reaction stopper | (C) Inorganic clloid | (D) Water-soluble polymer compound |
|---|---|---|---|---|
| 101* | — | — | — | — |
| 102* | 1 | Sodium hydrosulfite | — | — |
| 103 | 1 | Sodium hydrosulfite | b | — |
| 104* | 1 | — | — | Gelatin |
| 105 | 1 | Rongalit | b | Polyvinyl alcohol |
| 106 | 2 | Rongalit | a | Casein |
| 107 | 3 | Sodium sulfite | c | Polyacrylic acid |
| 108 | 4 | Sodium boron hydride | d | Sodium salt of carboxymethyl cellulose |
| 109 | 5 | Sodium thiosulfite | e | Polyvinyl-pyrrolidone |
| 110 | 6 | Sodium thiosulfite | f | Pectin |
| 111 | 7 | Sodium thiosulfite | g | Polyvinyl-pyrrolidone |
| 112 | 8 | Sodium hydrosulfite | b | Polyvinyl-pyrrolidone |
| 113 | 9 | Sodium hydrosulfite | a | Polyvinyl-pyrrolidone |
| 114 | 10 | Sodium hydrosulfite | d | Polyvinyl-pyrrolidone |

[TABLE 3]

| Experiment No. | Total concentration of (A) + (B) + (C) + (D) (wt. %) | (A):(B):(C):(D) (wt. ratio) | Alkaline compound (pH) | Solvent (wt. ratio) |
|---|---|---|---|---|
| 101* | 0.5 | — | NaOH (12.5) | Water:Methanol (90:10) |
| 102* | 0.5 | 100:10:—:— | NaOH (12.5) | Water:Methanol (90:10) |
| 103 | 0.5 | 100:10:100:— | NaOH (12.5) | Water:Methanol (90:10) |
| 104* | 0.5 | 100:—:—:100 | NaOH (12.5) | Water:Methanol (90:10) |
| 105 | 0.5 | 100:10:100:100 | NaOH (12.5) | Water:Methanol (90:10) |
| 106 | 0.5 | 100:5:100:100 | NaOH (12.5) | Water:Methanol (90:10) |
| 107 | 0.5 | 100:20:300:100 | NaOH (12.5) | Water:Acetone (70:30) |
| 108 | 0.5 | 100:10:300:50 | NaOH (12.5) | Water:Methanol (80:20) |
| 109 | 0.5 | 100:10:150:100 | KOH (12.5) | Water:Methanol (80:20) |
| 110 | 0.5 | 100:10:150:30 | KOH (12.5) | Water:Methanol (80:20) |
| 111 | 0.5 | 100:10:300:10 | KOH (12.5) | Water:Methanol (90:10) |
| 112 | 0.5 | 100:10:50:100 | KOH (12.5) | Water:Acetone (90:10) |
| 113 | 0.5 | 100:10:50:200 | KOH (12.5) | Water:Methanol (90:10) |
| 114 | 0.5 | 100:10:100:50 | KOH (12.5) | Water:Methanol (90:10) |

[TABLE 4]

| Experiment No. | Repetition Number of batches | Results of polymerization Polymer scale amount (g/m²) Liquid phase | Results of polymerization Polymer scale amount (g/m²) Gas phase-liquid phase interface | Number of fish eyes | Luminosity index (L) |
|---|---|---|---|---|---|
| 101* | 10 | 7 | 450 | 55 | 72.5 |
| 102* | 30 | 1 | 110 | 50 | 72.5 |
| 103 | 80 | 0 | 8 | 10 | 72.5 |
| 104* | 15 | 6 | 200 | 51 | 72.5 |
| 105 | 100 | 0 | 8 | 10 | 72.5 |
| 106 | 80 | 0 | 7 | 8 | 72.5 |
| 107 | 80 | 0 | 6 | 9 | 72.5 |
| 108 | 80 | 0 | 7 | 9 | 72.5 |
| 109 | 80 | 0 | 8 | 10 | 72.5 |
| 110 | 80 | 0 | 6 | 8 | 72.5 |
| 111 | 80 | 0 | 9 | 8 | 72.5 |
| 112 | 100 | 0 | 9 | 9 | 72.5 |
| 113 | 100 | 0 | 8 | 10 | 72.5 |
| 114 | 80 | 0 | 9 | 10 | 72.5 |

[TABLE 5]

| | Size of Colloidal particles (mμ) | Trade name (material) | Producer |
|---|---|---|---|
| a | 10–20 | Snowtex O (Colloidal silica) | Nissan Chemical Industries, Ltd. |
| b | 5–7 | Snowtex CXS-9 (Colloidal silica) | Nissan Chemical Industries, Ltd. |
| c | 100–200 | Titanium oxide | Nissan Chemical Industries, Ltd. |
| d | 10–20 | Aluminum oxide | Nissan Chemical Industries, Ltd. |
| e | 60–70 | Zirconium oxide | Nissan Chemical Industries, Ltd. |
| f | 20–50 | Tin oxide | Nissan Chemical Industries, Ltd. |
| g | 10–15 | Iron hydroxide | Prepared by the inventors |

Example 2

(Experiment Nos. 201 to 207)

In each experiment, polymerization was conducted using a stainless steel polymerization vessel with an inner capacity of 20 liters and having a stirrer.

In each experiment, the polymer scale preventive agent was prepared using a condensation product (A), a reaction stopper (B), an inorganic colloid (C) and a water-soluble polymer compound (D) as shown in Table 6, and a solvent and an alkaline compound as shown in Table 7 in such a manner that the conditions (formulation of solvent, total concentration of (A)+ (B)+(C)+(D), weight ratio of (A):(B):(C):(D), and pH) as shown in Table 7 are attained.

In each experiment, the polymer scale preventive agent was applied to the inner wall, the stirring shaft, the stirring blades and other areas, with which a monomer comes into contact, of the polymerization vessel. The thus applied preventive agent was dried by heating at 50° C. for 15 minutes to form a coating film, and the inside of the polymerization vessel was washed with water.

Thereafter, in each experiment polymerization was carried out as follows. Into the polymerization vessel in which the coating film was formed as above, 9 kg of water, 225 g of sodium dodecylbenzenesulfonate, 12 g of t-dodecyl mercaptan and 13 g of potassium peroxodisulfate were charged. After the atmosphere inside the polymerization vessel was replaced with a nitrogen gas, 1.3 kg of styrene and 3.8 kg of butadiene were charged, followed by polymerization at 50° C. for 20 hours. After the completion of the polymerization, the produced polymer was taken out and unreacted monomer was recovered out of the polymerization vessel. Subsequently, the inside of the polymerization vessel was washed with water and residual resin was removed.

As one batch being the operations from the formation of the coating film via the polymerization to the washing of the inside of the polymerization vessel with water, the same operatoins as above was repeated. The number of repetition times is shown in Table 8. After the final batch was over, the amount of polymer scale deposited on an area located in the liquid phase and on an area in the vicinity of the interface between the gas and liquid phases in the polymerization vessel, was measured in accordance with the same method as set forth in Example 1. The results are given in Table 8.

Further, to evaluate initial coloration at the time a polymer is formed into sheet, luminosity index (L) was measured according to the method below. The results are given in Table 8.

Measurement of luminosity index (L)

To 1 kg of a polymer latex obtained was added 1 kg of 2% magnesium sulfate solution to cause aggregation and sedimentation. The sediment was filtered off, washed with a hot water at 80° to 90° C. twice or three times and dried at 40° C. for 25 hours in a vacuum dryer to give a resin. The resin was placed in a mold measuring 9×9×0.1 cm (depth), heated at 195° C. under a pressure of 50 to 60 kgf/cm$^2$ for 0.2 hour and press molded under the final pressure of 80 kgf/cm$^2$ to prepare a test specimen.

This test specimen was measured for luminosity index (L) in the same manner as in Example 1.

[TABLE 6]

| Experiment No. | (A) Condensation product No. | (B) Reaction stopper | (C) Inorganic Colloid | (D) Water-soluble polymer compound |
|---|---|---|---|---|
| 201* | 1 | — | — | — |
| 202* | 1 | Sodium hydrosulfite | — | — |
| 203 | 1 | Sodium hydrosulfite | b | Polyacrylic acid |
| 204* | 1 | — | — | Polyvinyl-pyrrolidone |
| 205 | 5 | Rongalit | a | Polyacrylic acid |
| 206 | 8 | Hydrogen iodide | d | Casein |
| 207 | 10 | Sodium bisulfite | g | Gelatin |

[TABLE 7]

| Experiment No. | Total concentration of (A) + (B) + (C) + (D) (wt. %) | (A):(B):(C):(D) (wt. ratio) | Alkaline compound (pH) | Solvent (wt. ratio) |
|---|---|---|---|---|
| 201* | 0.5 | — | NaOH (12.5) | Water:Methanol (70:30) |
| 202* | 0.5 | 100:10:—:— | NaOH (12.5) | Water:Methanol (70:30) |
| 203 | 0.5 | 100:10:100:100 | NaOH (12.5) | Water:Methanol (70:30) |
| 204* | 0.5 | 100:—:—:100 | NaOH (12.5) | Water:Methanol (70:30) |
| 205 | 0.5 | 100:20:200:100 | NaOH (12.5) | Water:Acetone (80:20) |

[TABLE 7]-continued

| Experiment No. | Total concentration of (A) + (B) + (C) + (D) (wt. %) | (A):(B):(C):(D) (wt. ratio) | Alkaline compound (pH) | Solvent (wt. ratio) |
|---|---|---|---|---|
| 206 | 0.5 | 100:20:300:50 | NaOH (12.5) | Water:Methanol (70:30) |
| 207 | 0.5 | 100:20:150:50 | NaOH (12.5) | Water:Methanol (70:30) |

[TABLE 8]

| | | Results of polymerization | | |
|---|---|---|---|---|
| | | Polymer scale amount (g/m$^2$) | | |
| Experiment No. | Repetition Number of batches | Liquid phase | Gas phase-liquid phase interface | Luminosity index (L) |
| 201* | 5 | 15 | 330 | 84.0 |
| 202* | 9 | 2 | 20 | 84.5 |
| 203 | 30 | 0 | 12 | 84.5 |
| 204* | 7 | 9 | 250 | 84.0 |
| 205 | 30 | 0 | 8 | 84.5 |
| 206 | 28 | 0 | 8 | 84.5 |
| 207 | 28 | 0 | 12 | 84.5 |

Example 3

Polymerization was conducted using a stainless steel polymerization vessel with an inner capacity of 20 liters and having a stirrer.

The polymer scale preventive agent used in experiment No. 203 of Example 2 was applied to the inner wall, the stirring shaft, the stirring blades and other areas, with which a monomer comes into contact, of the polymerization vessel. The thus applied preventive agent was dried by heating at 50° C. for 15 minutes to form a coating film, and the inside of the polymerization vessel was washed with water.

Thereafter, into the polymerization vessel in which the coating film was formed as above, 4 kg of water and 6 g of sodium dodecylbenzenesulfonate were charged and the temperature was raised to 60° C. while stirring. Then, after the atmosphere within the polymerization vessel was replaced with nitrogen gas, the vessel was chaged with 94 g of n-butyl acrylate, 220 g of methyl methacrylate, 5 g of acrylic acid and 5 g of methacrylic acid. Subsequently, 1 g of ammonium persulfate and 1 g of sodium hydrosulfite were charged into the vessel and stirred at 60° C. for 20 minutes.

Furthermore, into the polymerization vessel were added a monomeric mixture (a mixture of 2.1 kg of n-butyl acrylate, 4.8 kg of methyl methacrylate, 100 g of acrylic acid and 100 g of methacrilic acid), 500 g of an aqueous 1 wt. % ammonium persulfate solution, 500 g of an aqueous 1 wt. % sodium hydrosulfite solution and 2.0 kg of an aqueous 25 wt. % polyoxyethylene nonyl phenyl ether solution, evenly over a 3-hour period. After the addition was completed, the polymerization vessel was heated to 70° C. and polymerization was carried out for 2 hours.

After the polymerization was over, the resulting polymeric product and unreacted monomers were recovered, and the inside of the vessel was washed with water to remove residual resin.

As one batch being the operations from the formation of the coating film via the polymerization to the washing of the inside of the polymerization vessel with water, the same operatoins as above was repeated 80 times. Upon the 80th batch, the amount of polymer scale deposited on areas located in the liquid phase and that on areas around the interface between gas and liquid phases inside the polymerization vessel were measured in the same manner as in Example 1. As a result, the measured amount of polymer scale deposited were 0 g/cm$^2$ at the liquid phase and 26 g/cm$^2$ at around the gas phase-liquid phase interface.

What is claimed is:

1. A process of producing a polymer of a monomer having an ethylenically unsaturated double bond, which comprises polymerizing the monomer in a polymerization vessel having a coating film on its inner wall surfaces, whereby polymer scale is prevented from being deposited, wherein said coating film is formed by applying, on said inner wall surfaces, an alkaline solution containing (A) an condensation product of (A-1) a hydroxy biphenyl compound with (A-2) an aldehyde compound, (B) a reaction stopper, and (C) an inorganic colloid on said inner wall surfaces, followed by drying.

2. The process of claim 1, wherein said coating film is further formed on other areas than the inner wall surfaces of the polymerization vesses with which the monomer comes into contact during the polymerization.

3. The process of claim 1, wherein the coating film after drying has a coating weight of 0.001 to 5 g/cm$^2$.

4. The process of claim 1, wherein said monomer is at least one compound selected from the group consisting of vinyl halides; vinyl esters; acrylic acid, methacrylic acid and esters and salts thereof; maleic acid, fumalic acid and esters and anhydrides thereof; diene monomers; styrene; acrylonitrile; vinylidene halides; and vinyl ethers.

5. The process of claim 1, wherein the polymerization is conducted as suspension polymerization or emulsion polymerization.

6. The process of claim 1, wherein said alkaline aqueous solution is further added to a polymerization system.

* * * * *